United States Patent [19]

Thorpe et al.

[11] 3,872,073

[45] Mar. 18, 1975

[54] PROCESS FOR THE PREPARATION OF CRYSTALLIZATION-RESISTANT DISPROPORTIONATED ROSIN

[75] Inventors: Susan Dale Thorpe; Curry Beach Davis; Charles Glenn Wheelus, all of Panama City, Fla.

[73] Assignee: Arizona Chemical Company, New York, N.Y.

[22] Filed: May 21, 1973

[21] Appl. No.: 362,618

[52] U.S. Cl. .................. 260/106, 260/97.5, 260/98, 260/398.5, 260/399
[51] Int. Cl. ............................ C09f 1/00, C09f 5/00
[58] Field of Search ...................... 260/97.5, 106, 98

[56] References Cited
UNITED STATES PATENTS

| | | | |
|---|---|---|---|
| 2,493,867 | 1/1950 | Gayer | 260/106 |
| 3,309,351 | 3/1967 | Schuller | 260/98 |
| 3,377,334 | 4/1968 | McBride | 260/98 |
| 3,423,389 | 1/1969 | Wheelus | 260/97.5 |

OTHER PUBLICATIONS

Harris, "Encyclopedia of Chemical Technology," Dec. 1953, pp. 796–798.

*Primary Examiner*—Donald E. Czaja
*Assistant Examiner*—William E. Parker
*Attorney, Agent, or Firm*—Harry H. Kline

[57] ABSTRACT

There is provided a crystallization-resistant disproportionated rosin prepared by heating a rosin material at temperatures between 250°C. and 275°C. in the presence of from 0.3 percent to 1 percent of specific phenol sulfides, hereinafter defined, for a time sufficient to increase the 9,10-secode-hydroabietic acid content to at least about 5 percent.

7 Claims, No Drawings

PROCESS FOR THE PREPARATION OF CRYSTALLIZATION-RESISTANT DISPROPORTIONATED ROSIN

The present invention relates to crystallization-resistant disproportionated rosin and to a process for preparing the same. More particularly, the invention relates to the disproportionation of a rosin utilizing a specific phenol sulfide treating agent for a time sufficient to increase the 9,10-secodehydroabietic content therein to at least about 5 percent, whereby a highly crystallization-resistant rosin is obtained.

As is known, rosin is widely and extensively employed in the manufacture of ester gums, paper sizes, synthetic resins, protective coatings, emulsifiers for disinfectants and insecticides, and in rubber polymerization and compounding. The major constituent of rosin is abietic acid and isomers thereof, including neoabietic, levopimaric, palustric, dihydroabietic, dehydroabietic, pimaric, and isopimaric acid. Minor constituent include, for instance, 9,10-secodehydroabietic acid, usually 1 percent or less, and $\Delta^6$-dehydrodehydroabietic acid. Because rosin is highly sensitive to oxidation, it has become customary to pretreat rosin so as to reduce the abietic acid content as low as possible. This has been achieved by disproportionation as disclosed in U.S. Pat. Nos. 3,277,072 and 3,377,344, which are incorporated herein by reference. In brief, disproportionation is a procedure whereby hydrogen is exchanged to give a more thermodynamically stable mixture of rosin acid isomers. In particular, dehydroabietic acid, which contains a stable aromatic ring, is the major product. Although disproportionation occurs by heating rosin at elevated temperatures in the presence of catalytic materials, such as iodine, sulfur, sulfur dioxide, palladium, platinum, and phenol sulfides, each of the treatments results in disproportionated rosins which have a pronounced tendency to crystallize. Thus, in the United States patent to Patrick et al., No. 3,277,072, there is disclosed a disproportionated rosin prepared by reacting a rosin at elevated temperatures in the presence of iodine. A hard, disproportionated rosin results. To modify the latter rosin, so as to obtain a fluid rosin, special precautions must be taken as for instance, heating the rosin with iodine catalyst to elevated temperatures under superatmospheric pressures. Hence, stringent conditions must be observed to attain a modified disproportionated rosin in the Patrick et al. patent. In another method, the patent to McBride et al., U.S. Pat. No. 3,377,334, discloses conditions leading to a disproportionated rosin without indicating therein any of the select conditions necessary to modify the physical properties. If a process could be developed for preparing a disproportionated rosin which resists crystallization and thereby is more easily handled without the utilization of stringent conditions, such a process would fulfill a long-felt need in the art.

It is, therefore, a principal object of the invention to provide a method for preparing a disproportionated rosin which is also resistant to crystallization. It is a further object of the invention to provide a process for the preparation of a crystallization-resistant rosin utilizing non-stringent conditions, that is, heat treatment in the presence of a disproportionation catalyst, whereby a crystallization-resistant rosin of increased 9,10 secodehydroabietic acid is obtained. These and other objects and advantages of the invention will become more apparent from a reading of the ensuing detailed description.

To these ends, it has been discovered that the above objects are attained by a disproportionation process which comprises treating rosin under critically controlled conditions of temperature, catalysts, catalyst concentrations, and time. In general, rosin is heated at a temperature between about 250°C. and about 275°C. in the presence of a phenol sulfide catalyst at concentrations ranging from 0.3 to 1 percent for a time sufficient to increase the 9,10-secodehydroabietic acid content from less than 1 percent to from 5 to 10 percent, usually for a time ranging from five to ten hours.

As employed herein, the term "rosin" includes tall oil rosin, gum or wood rosin, and mixtures containing the latter. Further, rosin mixtures include any of the mixtures of abietic acid with tall oil or tall oil fractions containing various proportions of rosin and fatty acids.

The catalytic phenol sulfides which are most useful for effecting crystallization-resistance are: 1-thio-2napthol, 1,1'-di-(2-naphthol)-disulfide, and 1,1'-di(2-naphthol)-sulfide. The latter is commercially available and is, therefore, the preferred treating agent. This select class of phenol sulfides is of critical import to obtain a rosin exhibiting crystallization resistance rendering the rosin more easily handleable, storable, and shippable, without separation, at temperatures ranging from approximately 30°C. to 120°C. Advantageously, the so-treated rosin remains stable even after further heating the same to temperatures of 300°C., or higher.

In general, the degree of disproportionation must be controlled so that the 9,10-secodehydroabietic acid content is increased to from 5 to 10 percent, and preferably between 6 and 8 percent, based on the weight of the rosin to be treated. The increase can conveniently be ascertained during the reaction by sampling and analysis employing, for instance, gas-liquid chromatography or an equivalent procedure.

The following examples further illustrate the invention, but are not to be deemed limitative thereof. All parts and percentages are by weight, unless otherwise specified.

EXAMPLE 1

To a suitable reaction vessel was charged 10,000 parts of tall oil rosin conforming to the Naval Stores Act of Feb. 8, 1952, and Federal Specification LLL-R-6266, Class C (May 27, 1957). The rosin charge was heated to 200°C., at which time 50 parts of 1,1'-di(2-naphthol)-sulfide was added and the mixture then heated to 250°C. Periodically, samples were taken to determine the 9,10-secodehydroabietic acid content by gas-liquid chromatography. At the end of six hours, 8 percent of 9,10-secodehydroabietic acid was noted and the reaction was terminated.

The disproportionated rosin exhibited only a trace of crystals after storage for a period of 30 days at 90°C.

EXAMPLE 2

Repeating Example 1, in every detail except that the temperature was increased from 250°C. to 300°C. and the catalyst charge reduced to 12 parts, yielded a disproportionated rosin which completely crystallized in less than 1 day at 90°C. On analysis, the 9,10-secodehydroabietic acid content was found to amount to 1 percent by gas-liquid chromatography.

EXAMPLE 3

The procedure of Example 1 was repeated in every detail except that the catalyst was 1,1'-di-(2-naphthol)-disulfide, the temperature increased to 260°C., and heated for a period of 8 hours.

On analysis, it was found that 7.5 percent of 9,10-secodehydroabietic acid was obtained by gas-liquid chromatography and exhibited a high resistance to crystallization.

Similar results were obtained when employing 1-thio-2-naphthol in the above example utilizing a temperature of 275°C. for about 9 hours.

EXAMPLE 4

A sample of tall oil rosin (1,000 parts) was charged into a three-neck, round-bottom flask. The rosin was heated to 200°C. under nitrogen and then 2 parts of 1,-1'-di-(2-naphthol)-disulfide was added. The reaction mixture was then heated to, and maintained at, 275°C. for 4 hours under a steam blanket.

Resultant product was found to be disproportionated, as evidenced by the low abietic acid content (0.3 percent). The 9,10-secodehydroabietic acid content therein was 3.6 percent as analyzed by gas liquid chromatography. After 30 days storage at 90°C., the product was found to be more than 80 percent crystallized.

We claim:

1. A method for preparing a crystallization-resistant disproportionated rosin comprising the steps of: heating a rosin until the 9,10-secodehydroabietic acid is increased to from 5 to 10 percent, based on the weight of said rosin, at a temperature ranging from about 250°C. to about 275°C. in the presence of about 0.3 to about 1 percent of a phenol sulfide selected from a group consisting of 1,1'-di-(2-naphthol)-disulfide, 1,1'-di-(2-naphthol)-sulfide, and 1-thio-2-naphthol, and recovering said crystallization-resistant disproportionated rosin.

2. The method according to claim 1 wherein the phenol sulfide is 1,1'-di(2-naphthol)-disulfide.

3. The process according to claim 1 wherein the phenol sulfide is 1,1'-di-(2-naphthol)-sulfide.

4. The process according to claim 1 wherein the phenol sulfide is 1-thio-2-naphthol.

5. The product prepared by the process of claim 1.

6. The process according to claim 2 wherein the heating is continued at about 250°C. for a period of eight hours until the 9,10-secodehydroabietic acid content is increased to about 8 percent.

7. The product prepared by the process of claim 6.

* * * * *